(12) United States Patent
Le Saint et al.

(10) Patent No.: US 8,306,228 B2
(45) Date of Patent: Nov. 6, 2012

(54) UNIVERSAL SECURE MESSAGING FOR CRYPTOGRAPHIC MODULES

(75) Inventors: Eric Le Saint, Fremont, CA (US); Wu Wen, Santa Clara, CA (US)

(73) Assignee: Activcard Ireland, Limited, Dublin (IE)

( * ) Notice: Subject to any disclaimer, the term of this patent is extended or adjusted under 35 U.S.C. 154(b) by 157 days.

(21) Appl. No.: 11/852,261

(22) Filed: Sep. 7, 2007

(65) Prior Publication Data

US 2008/0089521 A1    Apr. 17, 2008

Related U.S. Application Data

(63) Continuation of application No. 10/424,783, filed on Apr. 29, 2003, now abandoned.

(51) Int. Cl.
*H04L 9/08* (2006.01)

(52) U.S. Cl. .......... 380/278; 380/259; 380/260; 380/29; 705/67; 713/171; 726/3

(58) Field of Classification Search ................ 380/278, 380/259, 260, 29; 705/67; 713/171; 726/3
See application file for complete search history.

(56) References Cited

U.S. PATENT DOCUMENTS

| | | | |
|---|---|---|---|
| 5,131,038 A | 7/1992 | Puhl et al. ............... 340/5.61 |
| 5,235,642 A * | 8/1993 | Wobber et al. ............ 713/156 |
| 5,276,735 A | 1/1994 | Boebert et al. ............ 713/167 |
| 5,309,501 A | 5/1994 | Kozik et al. .............. 455/410 |
| 5,347,580 A | 9/1994 | Molva et al. ............. 713/159 |
| 5,448,045 A | 9/1995 | Clark ....................... 235/382 |
| 5,499,297 A | 3/1996 | Boebert ................... 713/159 |
| 5,546,463 A | 8/1996 | Caputo et al. ............ 713/159 |
| 5,638,444 A | 6/1997 | Chou et al. ............... 380/284 |
| 5,742,756 A | 4/1998 | Dillaway et al. .......... 726/20 |
| 5,778,071 A | 7/1998 | Caputo et al. ............ 713/159 |
| 5,821,854 A | 10/1998 | Dorinski et al. .......... 340/539.21 |
| 5,842,118 A | 11/1998 | Wood, Jr. ................. 455/101 |
| 5,878,142 A | 3/1999 | Caputo et al. ............ 713/159 |
| 5,937,068 A | 8/1999 | Audebert ................. 713/185 |
| 5,953,424 A | 9/1999 | Vogelesang et al. ....... 713/169 |
| 6,002,427 A | 12/1999 | Kipust ...................... 348/156 |
| 6,016,476 A | 1/2000 | Maes et al. ............... 705/18 |
| 6,038,551 A | 3/2000 | Barlow et al. ............ 705/41 |
| 6,069,952 A * | 5/2000 | Saito et al. ............... 705/57 |
| 6,070,240 A | 5/2000 | Xydis ....................... 726/17 |
| 6,075,860 A | 6/2000 | Ketcham .................. 713/159 |
| 6,084,968 A | 7/2000 | Kennedy et al. .......... 380/259 |
| 6,108,789 A | 8/2000 | Dancs et al. .............. 726/9 |
| 6,173,400 B1 | 1/2001 | Perlman et al. ........... 713/172 |
| 6,178,504 B1 | 1/2001 | Fieres et al. .............. 713/164 |
| 6,189,099 B1 | 2/2001 | Rallis et al. .............. 713/172 |
| 6,198,823 B1 | 3/2001 | Mills ........................ 380/247 |
| 6,216,230 B1 | 4/2001 | Rallis et al. .............. 713/185 |

(Continued)

*Primary Examiner* — April Shan
(74) *Attorney, Agent, or Firm* — Muirhead and Saturnelli, LLC

(57) ABSTRACT

An anonymous secure messaging method and system for securely exchanging information between a host computer system and a functionally connected cryptographic module. The invention comprises a Host Security Manager application in processing communications with a security executive program installed inside the cryptographic module. An SSL-like communications pathway is established between the host computer system and the cryptographic module. The initial session keys are generated by the host and securely exchanged using a PKI key pair associated with the cryptographic module. The secure communications pathway allows presentation of critical security parameter (CSP) without clear text disclosure of the CSP and further allows use of the generated session keys as temporary substitutes of the CSP for the session in which the session keys were created.

17 Claims, 13 Drawing Sheets

U.S. PATENT DOCUMENTS

| | | | |
|---|---|---|---|
| 6,373,946 B1 | 4/2002 | Johnston | 380/211 |
| 6,378,073 B1 | 4/2002 | Davis et al. | 726/1 |
| 6,385,729 B1 | 5/2002 | DiGiorgio et al. | 726/9 |
| 6,425,084 B1 | 7/2002 | Rallis et al. | 713/185 |
| 6,459,704 B1 | 10/2002 | Jandrell | 370/445 |
| 6,481,632 B2 | 11/2002 | Wentker et al. | 235/492 |
| 6,490,679 B1 | 12/2002 | Tumblin et al. | 713/155 |
| 6,570,610 B1 | 5/2003 | Kipust | 348/156 |
| 6,588,660 B1 | 7/2003 | Buescher et al. | 235/382 |
| 6,601,771 B2 | 8/2003 | Charrin | 235/492 |
| 6,609,199 B1 | 8/2003 | DeTreville | 713/172 |
| 6,763,315 B2 | 7/2004 | Xydis | 702/127 |
| 6,877,094 B1 | 4/2005 | DiGiorgio et al. | 713/176 |
| 6,931,529 B2 | 8/2005 | Kunzinger | 713/153 |
| 6,993,658 B1 | 1/2006 | Engberg et al. | 713/185 |
| 7,020,773 B1 | 3/2006 | Otway et al. | 713/171 |
| 7,080,782 B2 | 7/2006 | Charrin | 235/451 |
| 7,114,178 B2 | 9/2006 | Dent et al. | 726/6 |
| 7,162,631 B2 | 1/2007 | Audebert et al. | 713/160 |
| 7,174,569 B1* | 2/2007 | Trostle | 726/30 |
| 7,225,465 B2 | 5/2007 | Audebert et al. | 726/20 |
| 7,269,732 B2 | 9/2007 | Kilian-Kehr | 713/172 |
| 7,269,844 B2 | 9/2007 | Elteto et al. | 726/2 |
| 7,302,571 B2 | 11/2007 | Noble et al. | 713/172 |
| 7,310,734 B2 | 12/2007 | Boate et al. | 713/186 |
| 7,315,943 B2* | 1/2008 | Shibata | 713/168 |
| 7,324,645 B1 | 1/2008 | Juopperi et al. | 380/247 |
| 7,340,600 B1 | 3/2008 | Corella | 713/155 |
| 7,363,486 B2 | 4/2008 | Audebert et al. | 713/150 |
| 7,366,703 B2 | 4/2008 | Gray et al. | 705/78 |
| 7,370,350 B1* | 5/2008 | Salowey | 726/7 |
| 7,409,552 B2 | 8/2008 | Buttyan et al. | 713/172 |
| 7,650,647 B1 | 1/2010 | Hansmann et al. | 726/34 |
| 7,907,935 B2 | 3/2011 | Le Saint et al. | 455/411 |
| 8,065,718 B2 | 11/2011 | Grove et al. | 726/9 |
| 2001/0007815 A1 | 7/2001 | Philipsson | 455/41 |
| 2001/0012360 A1 | 8/2001 | Akkar et al. | 380/29 |
| 2001/0013830 A1 | 8/2001 | Garber et al. | 340/572.4 |
| 2001/0020897 A1 | 9/2001 | Takatori et al. | 340/572.7 |
| 2001/0021950 A1 | 9/2001 | Hawley et al. | 709/225 |
| 2001/0037312 A1 | 11/2001 | Gray et al. | 705/67 |
| 2001/0045451 A1 | 11/2001 | Tan et al. | 235/375 |
| 2001/0047343 A1* | 11/2001 | Dahan et al. | 705/76 |
| 2002/0040936 A1 | 4/2002 | Wentker et al. | 235/492 |
| 2002/0046342 A1 | 4/2002 | Elteto et al. | 713/185 |
| 2002/0065625 A1 | 5/2002 | Xydis | 702/127 |
| 2002/0066042 A1 | 5/2002 | Matsumoto et al. | 713/202 |
| 2002/0069030 A1 | 6/2002 | Xydis | 702/176 |
| 2002/0091921 A1 | 7/2002 | Kunzinger | 713/153 |
| 2002/0095587 A1 | 7/2002 | Doyle et al. | 713/186 |
| 2002/0145051 A1 | 10/2002 | Charrin | 235/492 |
| 2002/0171546 A1 | 11/2002 | Evans et al. | 340/540 |
| 2003/0005300 A1 | 1/2003 | Noble et al. | 713/172 |
| 2003/0041244 A1 | 2/2003 | Buttyan et al. | 713/172 |
| 2003/0093690 A1* | 5/2003 | Kemper | 713/201 |
| 2003/0217148 A1* | 11/2003 | Mullen et al. | 709/225 |
| 2004/0054717 A1 | 3/2004 | Aubry et al. | 709/203 |
| 2004/0088567 A1 | 5/2004 | Lamotte | 713/200 |
| 2005/0033702 A1 | 2/2005 | Holdsworth | 705/67 |
| 2005/0033703 A1 | 2/2005 | Holdsworth | 705/67 |
| 2005/0044385 A1 | 2/2005 | Holdsworth | 713/185 |
| 2005/0044393 A1 | 2/2005 | Holdsworth | 713/200 |
| 2005/0055452 A1 | 3/2005 | Suzuki et al. | 709/229 |
| 2005/0071282 A1 | 3/2005 | Lu et al. | 705/64 |
| 2005/0100166 A1* | 5/2005 | Smetters et al. | 380/277 |
| 2005/0120213 A1* | 6/2005 | Winget et al. | 713/171 |
| 2005/0138421 A1 | 6/2005 | Fedronic et al. | 713/201 |
| 2007/0245148 A1 | 10/2007 | Buer | 713/182 |
| 2011/0252466 A1 | 10/2011 | Le Saint et al. | 726/9 |

* cited by examiner

UNIVERSAL SECURE MESSAGING FOR CRYPTOGRAPHIC MODULES

This application is a continuation of application Ser. No. 10/424,783 filed Apr. 29, 2003, now abandoned the entire disclosure of which is incorporated by reference herein.

FIELD OF INVENTION

The present invention relates generally to a data processing system, method and computer program product and more specifically to a secure critical security parameter transport arrangement between a host computer system and an associated cryptographic module.

BACKGROUND

In high security operating environments, the US National Institute of Standards and Technology (NIST) specifies in FIPS PUB 140-2, "Security Requirements For Cryptographic Modules," for security levels 3 and 4 that critical security parameters (CSP) such as authentication data, passwords, PINs, CSPs, biometric samples, secret and private cryptographic keys be entered into or output from a cryptographic module in an encrypted form, generally using some form of physical and/or logical trusted path or secure messaging channel to prevent interception of the critical security parameters.

The cryptographic modules referred to in this specification include hardware based security devices such as security tokens, smart cards, integrated circuit chip cards, portable data carriers (PDC), personal security devices (PSD), subscriber identification modules (SIM), wireless identification modules (WIM), USB token dongles, identification tokens, secure application modules (SAM), hardware security modules (HSM), secure multi-media token (SMMC), trusted platform computing alliance chips (TPCA) and like devices.

Attempts at providing a physical trusted path include the use of cryptographic hardware devices installed between input devices such as the keyboard and possibly the mouse. An example of such a cryptographic interface device is disclosed in U.S. Pat. No. 5,841,868 to Helbig. However, the hardware expenditures and added administrative burden greatly increases the cost of the computer system.

In another approach, U.S. Pat. No. 4,945,468 to Carson, et al., a trusted path is generated by providing a new virtual terminal window which allows secure entry of CSPs. The new virtual terminal window is effectively isolated from other running processes. This method is a reasonably secure approach but does not extend the trusted path to peripheral security devices such as cryptography modules, cryptographic modules and biometric scanners.

In yet another approach, U.S. patent application Ser. No. 2002/0095587 to Doyle, et al. discloses a wireless SSL or equivalent connection which utilizes negotiated time-limited cryptography keys to maintain a chain of trust between interconnected security devices. However, the mechanism disclosed relies heavily on multiple public key cryptography key pairs which is difficult to maintain and may reduce overall performance due to relatively slow transaction processing when employed using a smart card. In addition, negotiation of time-limited cryptography keys relies on devices containing a system clock for changing of cryptographic keys. Smart cards and like devices do not include system clocks and thus cannot be part of the negotiated key exchange.

Cryptographic mechanisms are available in the relevant art which could be adapted to encrypt an incoming CSP with a cryptographic key for secure transport through a host and eventual decryption by a security executive installed within the cryptographic module. However, the cryptographic mechanism employed by the host must provide a sufficient level of security to prevent interception of the cryptographic keys used in encrypting the CSP and furthermore limits vulnerability to a replay type attack.

Another common vulnerability in the relevant art relates to the lack of ability to bind a CSP to a session, which potentially allows an unlocked cryptographic module to accessed by an unauthorized entity. To address this potential vulnerability, the CSP is typically cached or stored and presented by software to the cryptographic module each time access is required. The cached or stored CSPs are likewise vulnerable to interception or compromise by an authorized entity.

Therefore, it would highly advantageous to provide a secure CSP transport system which limits an intruder's ability to intercept a cryptographic key, is relatively invulnerable to a replay type attack, minimizes requests for user input of CSPs already provided within a session and does not store or otherwise cache a CSP.

SUMMARY

This invention addresses the limitations described above and provides an efficient secure messaging arrangement to securely exchange information between a host computer system and a cryptographic module. The secure messaging arrangement may be used to securely transport a critical security parameter (CSP) to the cryptographic module without clear text disclosure of the CSP but is not limited to this one implementation. The invention is comprised of a host computer system and a functionally connected cryptographic module. The host computer system may be locally or remotely connected to the cryptographic module.

The host computer system includes a Host Security Manager application having the functional capacity to generate a session key and perform symmetric and asymmetric cryptography.

The session key is a symmetric key generated or derived from a random number having a sufficient bit strength to prevent unauthorized access to the information being exchanged in the secure messaging session. A unique session identifier is associated with the session key which is generated and supplied by the cryptographic module.

Multiple messaging sessions may be established to perform various activities with the cryptographic module. The session identifier is used by the Host Security Manager application to select the appropriate session key for a particular function.

The session key generated by the Host Security Manager application is sent to the cryptographic module using a secure key exchange. A public key associated with the cryptographic module is retrieved and used to encrypt a duplicate of the session key using public key infrastructure (PKI) cryptography. The public key is retrieved from a X.509 compliant digital certificate supplied directly from the cryptographic module, from a remote server or from a certificate authority.

Once the session keys are securely shared and assigned the unique session identifier, CSP transfer, bulk encryption and decryption and message authentication code (MAC) verification are performed using the session keys and a symmetric cryptography method such as DES, 3DES, AES or equivalent symmetric encryption method.

The cryptographic module includes the private key counterpart to the public key and a Security Executive application. The Security Executive application includes the functional capabilities of performing its portion of the secure key exchange using the private key counterpart for decrypting the duplicate of session key, generating a unique session identifier, sharing the unique session identifier with the host computer system, associating the unique session identifier with each session key and performing the symmetric cryptographic functions on the information being exchanged through the secure messaging arrangement in conjunction with the host computer system.

As an added security enhancement to the basic embodiment of the invention, additional cryptographic functions such as attaching and verifying message authentication codes to the information exchanged between the host computer system and the cryptographic module.

The programs and associated data may be recorded on transportable digital recording media such as a CD ROM, floppy disk, data tape, or DVD for installing on a host computer system and/or cryptographic module.

One embodiment of the invention provides a secure messaging arrangement that allows a subsequent use of a symmetric key as a surrogate for a CSP for gaining access to a CSP protected application installed in a cryptographic module. The symmetric key is generated on a host computer system and may include a timestamp or unique session identifier to prevent replay type attacks.

The symmetric key is typically a random number having a sufficient bit strength of at least 64 bits but preferably 112 bits or greater to assure adequate security and performance. The term symmetric key is intended to be synonymous with a session key.

A CSP is supplied by a user or other entity to initially access the cryptographic module after the session keys are established. In a basic embodiment of the invention, both the CSP and a duplicate of the symmetric key are sent to the cryptographic module by a Host Security Manager application installed on the host computer system. The Host Security Manager application uses the symmetric key to encrypt the CSP during transfer between the host and the cryptographic module. This minimizes the likelihood of unauthorized monitoring of the CSP.

A Security Executive application installed inside the cryptographic module verifies and/or authenticates the CSP and temporarily allows access to a CSP protected application. The duplicate symmetric key is temporarily granted permission to unlock all of the applications authorized for the particular CSP for the duration of a session. Subsequent access to one or more of the authorized applications requires presentation of the symmetry key to the Security Executive application. Multiple symmetric keys may be established to allow access to applications which require different CSPs and/or associated with different entities requiring access to the cryptographic module.

The duration of the session is controlled by the entity or user, removal of the cryptographic module from its interface with the host, logout from the host or exceeding a predetermined session duration terminates the session and requires reentry of the CSP.

BRIEF DESCRIPTION OF DRAWINGS

The features and advantages of the invention will become apparent from the following detailed description when considered in conjunction with the accompanying drawings. Where possible, the same reference numerals and characters are used to denote like features, elements, components or portions of the invention. It is intended that changes and modifications can be made to the described embodiment without departing from the true scope and spirit of the subject invention as defined in the claims.

DETAILED DESCRIPTION

This present invention provides an anonymous secure messaging arrangement which allows transfer of critical security parameters and other information exchanged between a host computer system and a functionally connected cryptographic module In addition, the secure messaging arrangement provides a session based temporary surrogate CSP following initial presentation and verification of a CSP to the cryptographic module. The applications are envisioned to be programmed in a high level language using such as Java™, C++, C or Visual Basic™.

Figure 1:
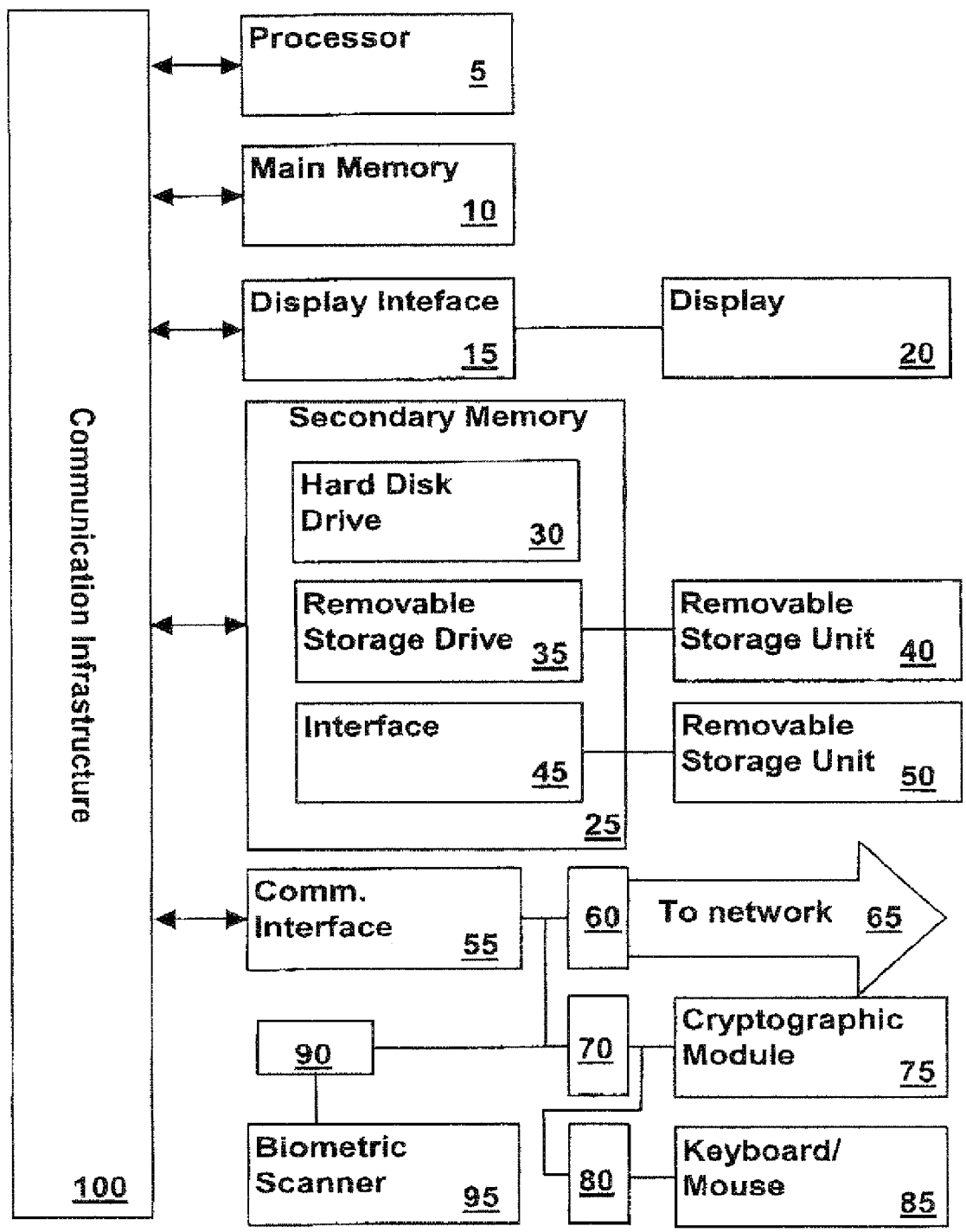
FIG. 1—is a generalized block diagram of a host computer system and a functionally connected cryptographic module.

Referring to FIG. 1, a typical host computer system is shown which includes a processor 5, a main memory 10, a display 20 electrically coupled to a display interface, a secondary memory subsystem 25 electrically coupled to a hard disk drive 30, a removable storage drive 35 electrically coupled to a removable storage unit 40 and an auxiliary removable storage interface 45 electrically coupled to an auxiliary removable storage unit 50.

A communications interface 55 subsystem is coupled to a network interface 60 and a network 65, a cryptographic module interface 70 and a cryptographic module 75, a user input interface 80 including a mouse and a keyboard 85, a biometric scanner interface 90 and a biometric scanner 95.

The processor 5, main memory 10, display interface 15 secondary memory subsystem 25 and communications interface system 55 are electrically coupled to a communications infrastructure 100. The host computer system includes an operating system, a Host Security Manager application, other applications software, cryptography software capable of performing symmetric and asymmetric cryptographic functions, secure messaging software and device interface software.

The cryptographic module 75 includes a wireless, optical and/or electrical connection means compatible with the cryptographic module interface 70, a processor, volatile and non-volatile memory electrically coupled to the processor, a runtime operating environment, cryptography extensions incorporated into the operating system and capable of performing symmetric and asymmetric cryptographic functions compatible with the host cryptography software, a Security Executive application, one or more CSP protected applications functionally coupled to the Security Executive application and a public key infrastructure (PKI) key pair functionally coupled to the Security Executive application.

The non-volatile memory has operatively stored therein one or more reference CSPs which are verified by the Security Executive application to allow access to the one or more CSP protected applications.

Figure 1A:
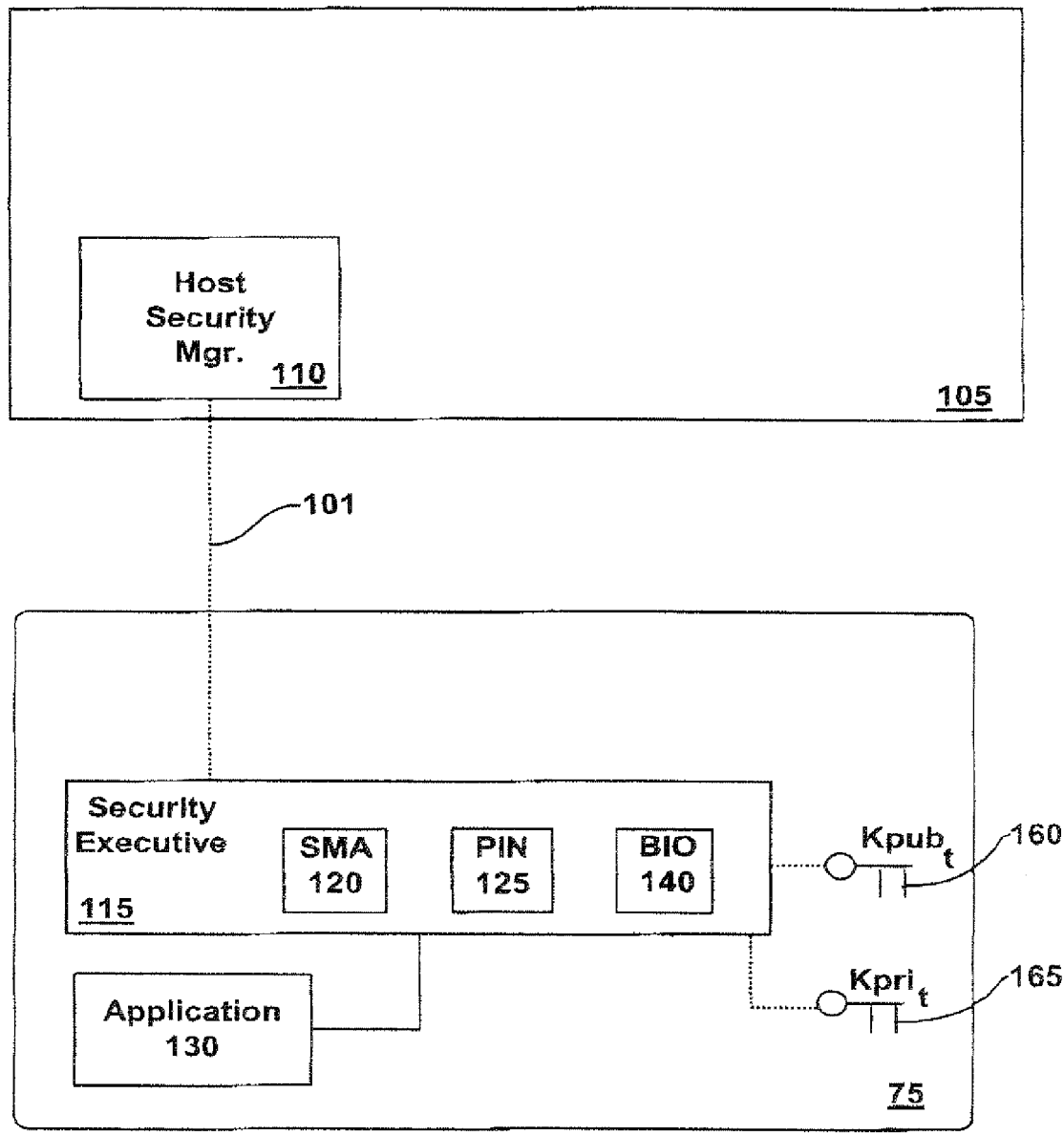
FIG. 1A—is a generalized block diagram of a first embodiment of the invention.

Referring to FIG. 1A, a generalized arrangement of a host computer system 105 and an associated cryptographic module 75 are shown. The host computer system 105 includes a Host Security Manager application 110 that communicates with a Security Executive application 115 installed in the cryptographic module 75 via a communications link 101. The messaging protocol employed over the communications link 101 may include an ISO 7816 compliant communications protocol. The communications link 101 includes electrical, optical and wireless connections.

The Host Security Manager application 110 includes the ability to perform cryptographic functions available through the cryptography software and extensions, including generation of one or more session based symmetric key pairs for use as block cipher keys during information exchange over the communications link 101.

The Host Security Manager application 110 may exist as a single application or a plurality of interrelated applications and library extensions. The session keys may be used as temporary CSP surrogates which allows access to security functions initially authenticated with the required CSP. The Host Security Manager application 110 further includes the ability to uniquely associate each of the generated symmetric keys with a particular CSP and a CSP protected application installed in the cryptographic module 75. In one embodiment of the invention, access requirements are determined by security policies maintained within the cryptographic module as is described in co-pending U.S. patent application Ser. No. 10/321,624 to Eric Le Saint & al. filed on Dec. 18, 2002, entitled "Uniform Framework for Security Tokens," and herein incorporated by reference.

Additional security policies may be combined with the security policies established for the cryptographic module as is described in co-pending U.S. patent application to Eric Le Saint & al. filed the same day as this application, entitled "Uniform Framework For Host Computer System," and herein incorporated by reference. In general, the relevant portions of the security policies are comprised of access control rules having a general form shown as an example in Table 1 below;

TABLE 1

| Rule ID | Rule | State | Session ID |
|---|---|---|---|
| ACR1 | AM1[PIN] + SM | 0/1 | SID01 |
| ACR2 | AM2[BIO] + SM | 0/1 | SID02 |
| ACR3 | AM1[PIN] + AM[BIO] + SM | 0/1 | SID03 |

Where;

ACR# refers to an access control rule; AM# refers to an authentication application installed inside the cryptographic module; PIN refers to a CSP in the form of a personal identification number required by the authentication application; BIO refers to a CSP in the form a biometric sample required by the authentication application; and SM refers to a secure messaging application.

The state of each executed access control rule is maintained in a session table and is shown as a binary flag. The session ID is used to determine which session key is assigned the surrogate privileges provided by the PIN and BIO CSPs. In an alternate embodiment of the invention, the Host Security Manager application 110 maintains an equivalent table.

The generated session keys are temporarily stored in main memory 10 (FIG. 1) by the Host Security Manager application 110 and retrieved when required to access a particular function installed inside the cryptographic module 75. The session keys provide secure messaging between the cryptographic module and the host computer system related to Secure Socket Layer (SSL) or Internet Protocol Security (IPsec) messaging sessions. To ensure message integrity, keyed message authentication codes are generated and verified at both ends of the communications link 101.

The Security Executive application 115 installed inside the cryptographic module 75 includes the ability to perform the cryptographic functions available from cryptography applications and extensions including; authenticating a received CSP CSPs against the stored CSPs and the ability to allow one or more session keys to operate as a temporary surrogate(s) for the reference CSP(s) for gaining access to the one or more CSP protected applications 130 after initial authentication with the actual CSP(s). The temporary surrogates) are stored in the volatile memory by the Security Executive application.

The Security Executive application 115 may exist as a single application or a plurality of interrelated applications and library extensions. The received CSP includes of a personal identification number (PIN), biometric sample, password, phase phrase, cryptographic key or any combination thereof as described in FIPS Pub 140-2, "Security Requirements For Cryptographic Modules," included as a reference to this disclosure.

The Security Executive application 115 controls access to one or more applications 130 by requiring a secure messaging session be established using a secure messaging application SMA 120 and entity authentication using a personal identification number (PIN) PIN 125 or a biometric sample BIO 140. A PKI infrastructure key pair $Kpub_t$ 160 and $Kpri_t$ 165 is provided to perform secure session key exchanges between the host computer system 105 and cryptographic module 75. The public key $Kpub_t$ 160 is not required to be retained inside the cryptographic module 75. The public key 160, may be freely distributed using a digital certificate or other mechanism.

Figure 1B:
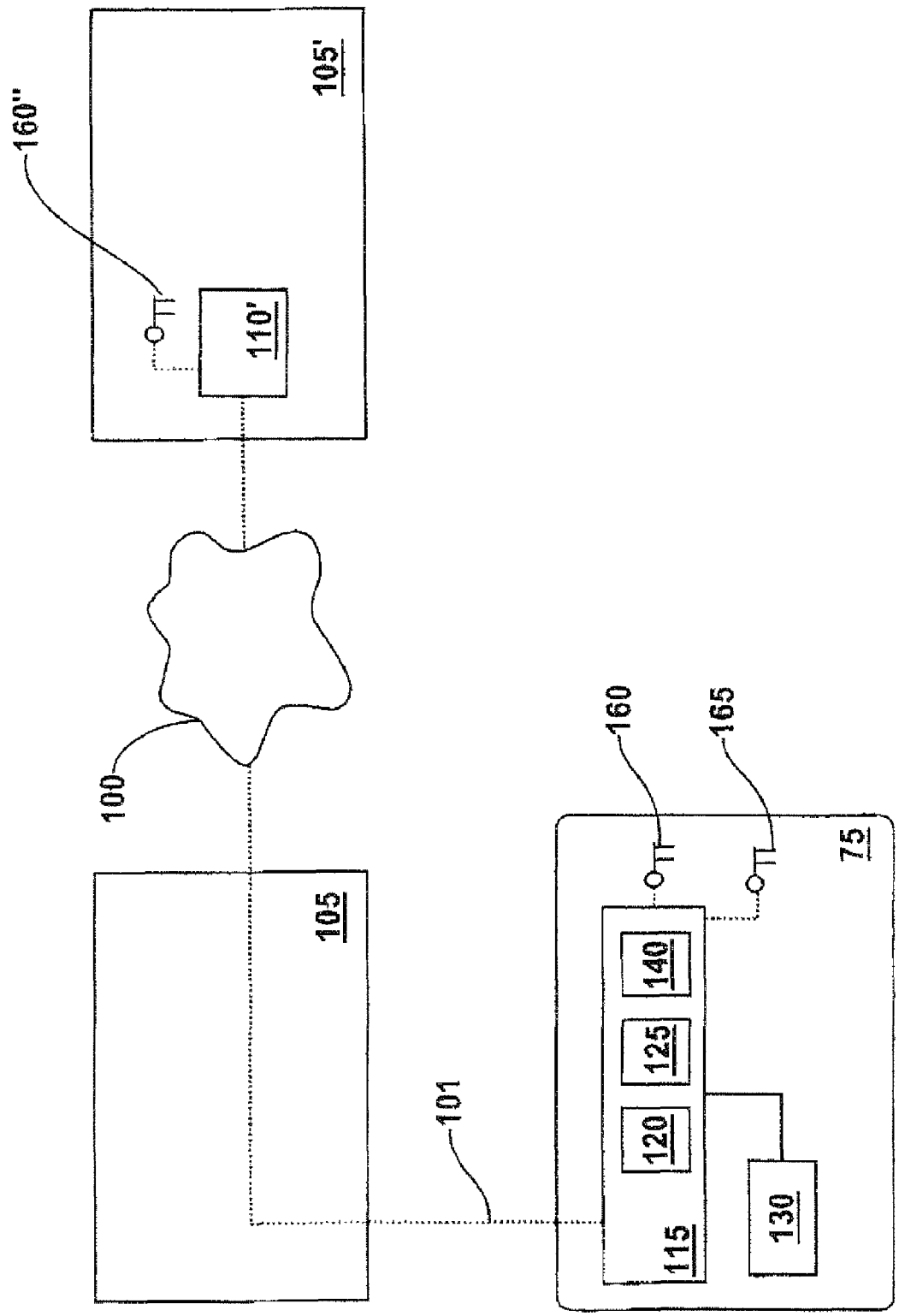
FIG. 1B—is a generalized block diagram of an alternate embodiment of the invention which incorporates a remote host computer system.

Referring to FIG. 1B, and alternative embodiment of the invention is shown where a cryptographic module 75 is coupled to a local host computer system 105 and is in processing communications over a network 100 with a remote Host Security Manager 110' installed on a remote host computer system 105'. The cryptographic module 75 includes the public key 160 and the private key 165. In this example, a duplicate of the public key when 160" is shown associated with the remote Host Security Manager 110'.

Figure 2:
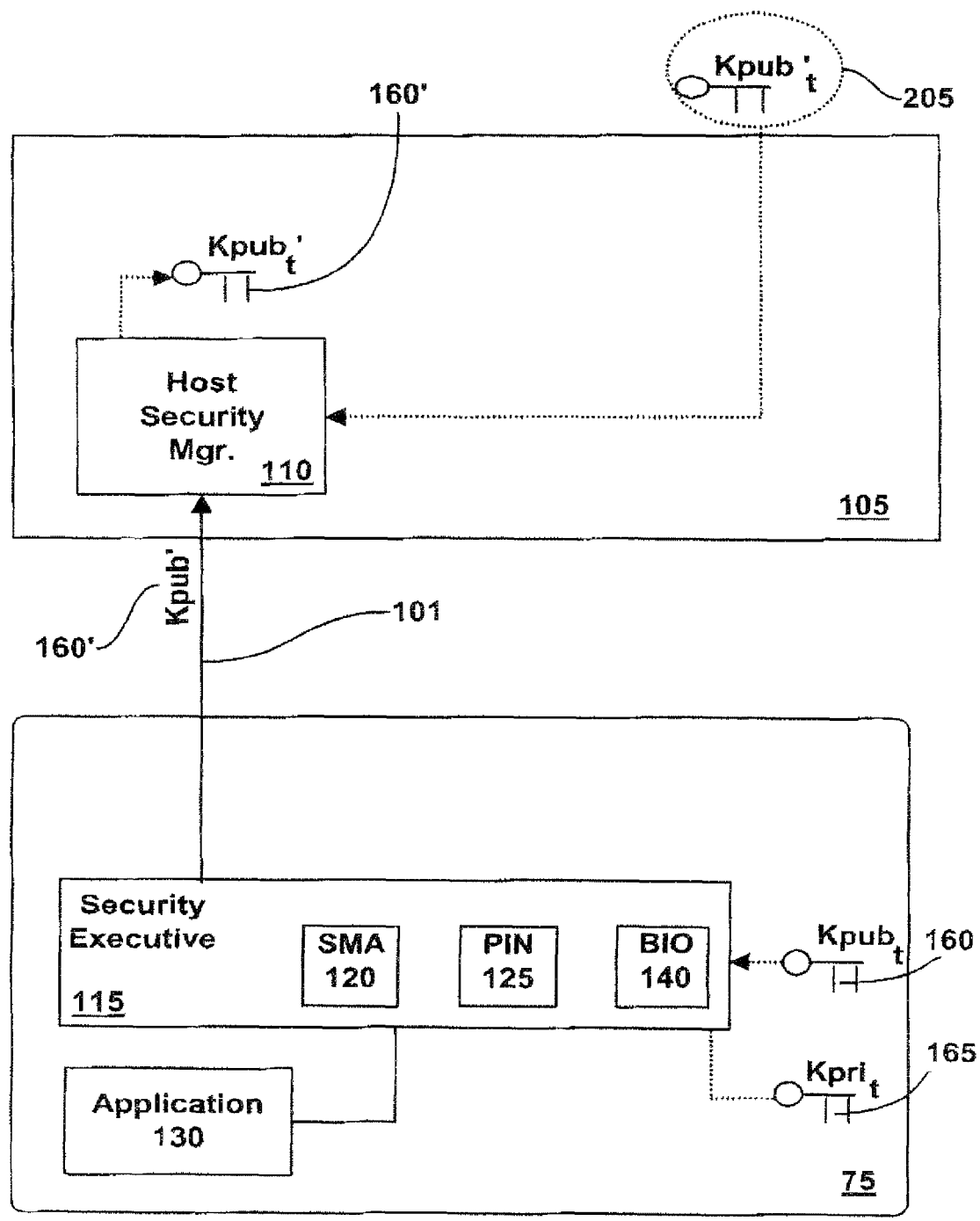
FIG. 2—is a detailed block diagram of a public key receipt by a host computer system.

Referring to FIG. 2, the public key Kpub'$_t$ 160' is shown being retrieved by the host computer system 105 from either the cryptographic module 75 or from another source in the form of an X.509 certificate 205.

When transferred from the cryptographic module 75, the Security Executive application 115 routes the public key Kpub$_t$' 160' over the communications link 101 for use by the Host Security Manager application 110. The public key Kpub'$_t$ 160' will be used to perform secure session key exchanges between the host computer system 105 and cryptographic module 75.

Figure 2A:
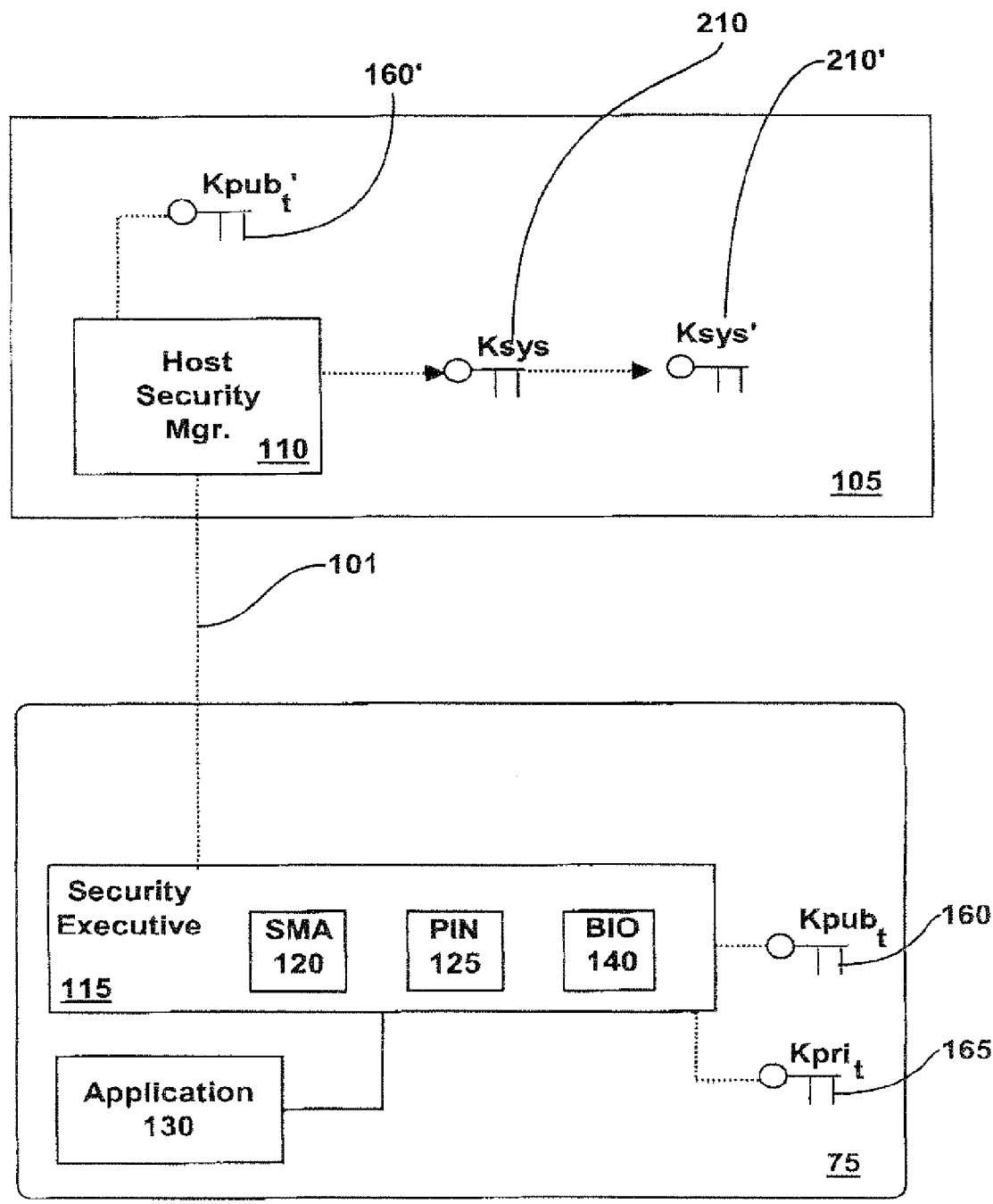
FIG. 2A—is a detailed block diagram of the invention where a session key pair is generated by the host computer system.

Referring to FIG. 2A, an anonymous secure messaging session is initiated by generating a session key pair. The session key pairs Ksys 210 and Ksys' 210' are identical symmetric keys generated or derived from a random number having a sufficient bit strength of at least 64 bits to assure adequate security and performance. The host computer system 105 may generate the session key pair automatically when the cryptographic module 75 becomes functionally connected or in response to a request to access the cryptographic module 75.

Figure 2B:
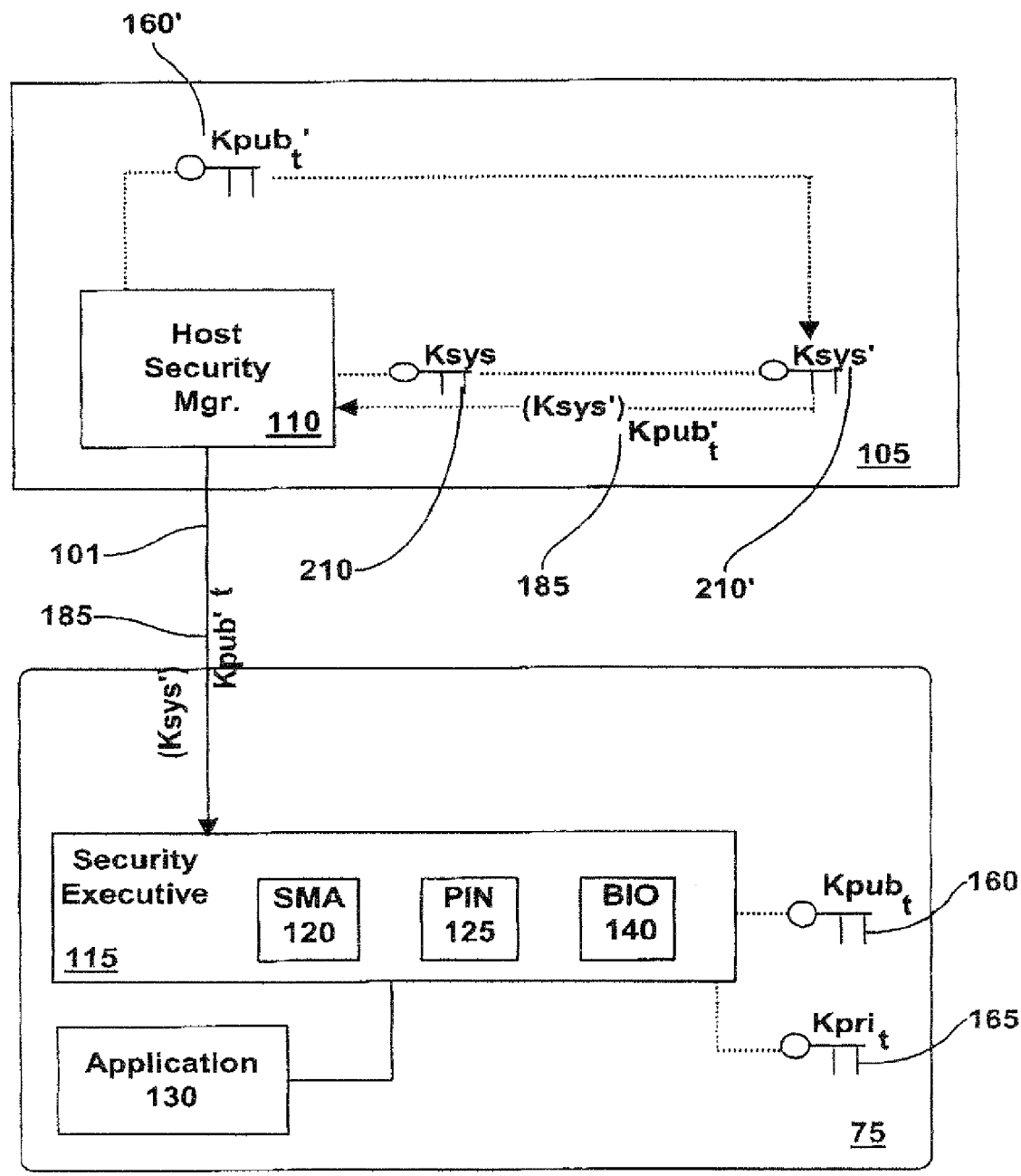
FIG. 2B—is a detailed block diagram of the invention where a secure key exchange is performed between the host computer system and a functionally connected cryptographic module.

Referring to FIG. 2B, the public key Kpub$_t$' 160' is used to encrypt one of the session keys Ksys' 210' for secure transport to the cryptographic module 75. The encrypted session key (Ksys')$_{Kpub't}$ 185 is sent over the communications link 101 to the cryptographic module 75 and received by the Security Executive application 115.

Figure 2C:
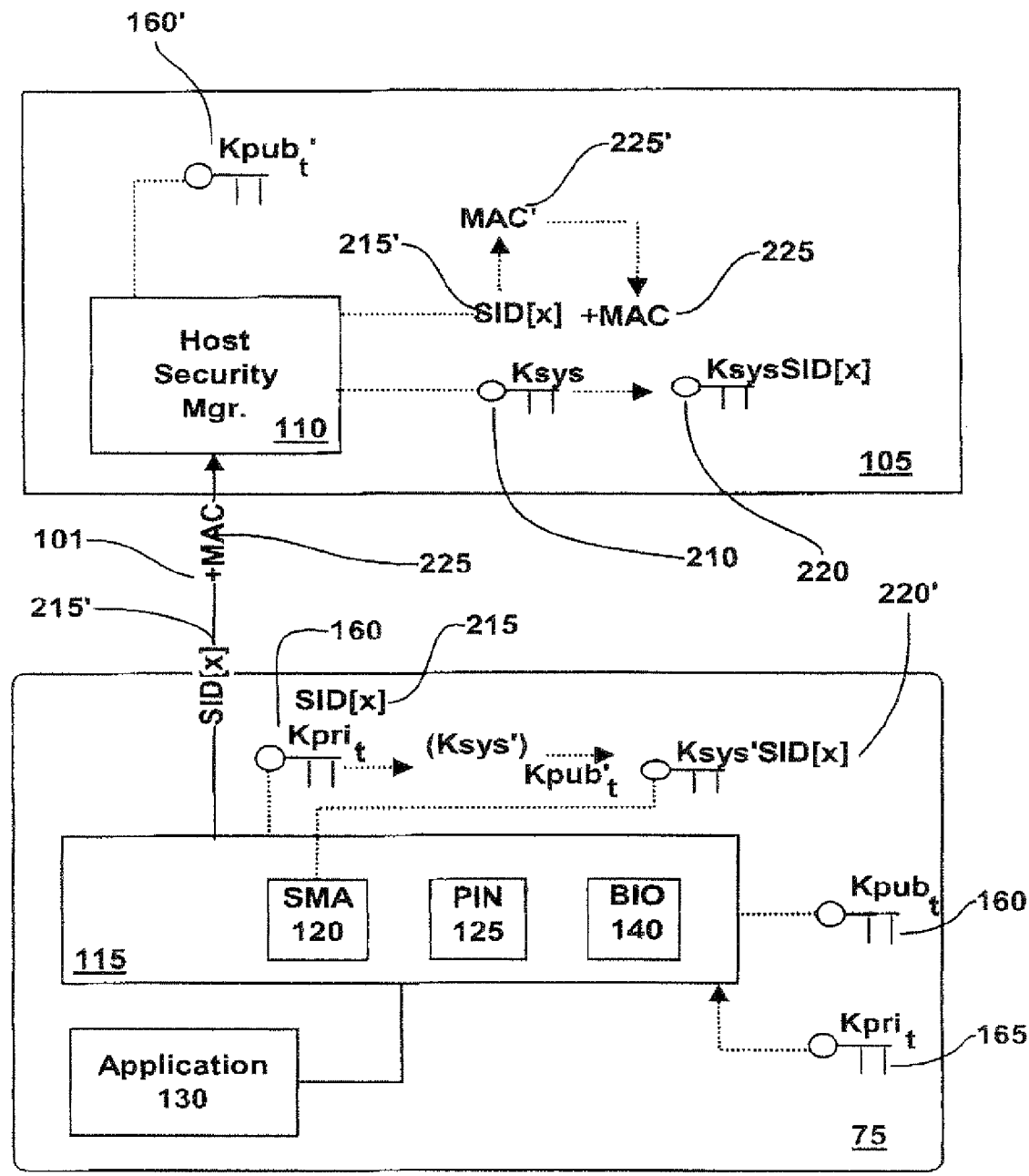
FIG. 2C—is a detailed block diagram of the invention where a unique session identifier is assigned to the session key pair.

Referring to FIG. 2C, the Security Executive application 115 decrypts the encrypted session key (Ksys')$_{Kpub't}$ 185 using the private key Kpri$_t$ 165 counterpart to the public key Kpub$_t$ 160. The session key Ksys' 210' is assigned a unique session identifier SID[x] 215 and maintained by the secure messaging application SMA 120 as part of the secure messaging arrangement Ksys'SID[x] 220'. A keyed message authentication code MAC 225 is then generated using the received session key Ksys' 210'. The unique session identifier SID[x] 215' and MAC 225 are then sent over the communications link 101 to the host computer system 105 and received by the Host Security Manager application 110.

The Host Security Manager Application 110 generates a MAC' 225' of the received session identifier SID[x] 215' and compares it to the received MAC 225. If the generated MAC' 225' matches the received MAC 225, the unique session identifier is associated with the counterpart session key KsysSID[x] 220 by the Host Security Manager application 110. The MAC binds the authenticated entity to the particular session key pair and session.

The message authentication code utilizes a keyed message digest algorithm such as DES-based X9.9 or preferably a MAC which utilizes a more robust encryption algorithm and greater bit strength such as AES. When used with ISO 7816 compliant cryptographic devices, the entire command APDU may be encrypted and MAC'ed using the session key Ksys'SID[x] 220'. In an alternate embodiment of the invention, a separate set of symmetric keys are generated for use with the keyed message authentication code algorithms. For simplicity, the second set of MAC session keys is not shown but operates equivalently to the described implementations of the session keys.

Figure 2D:
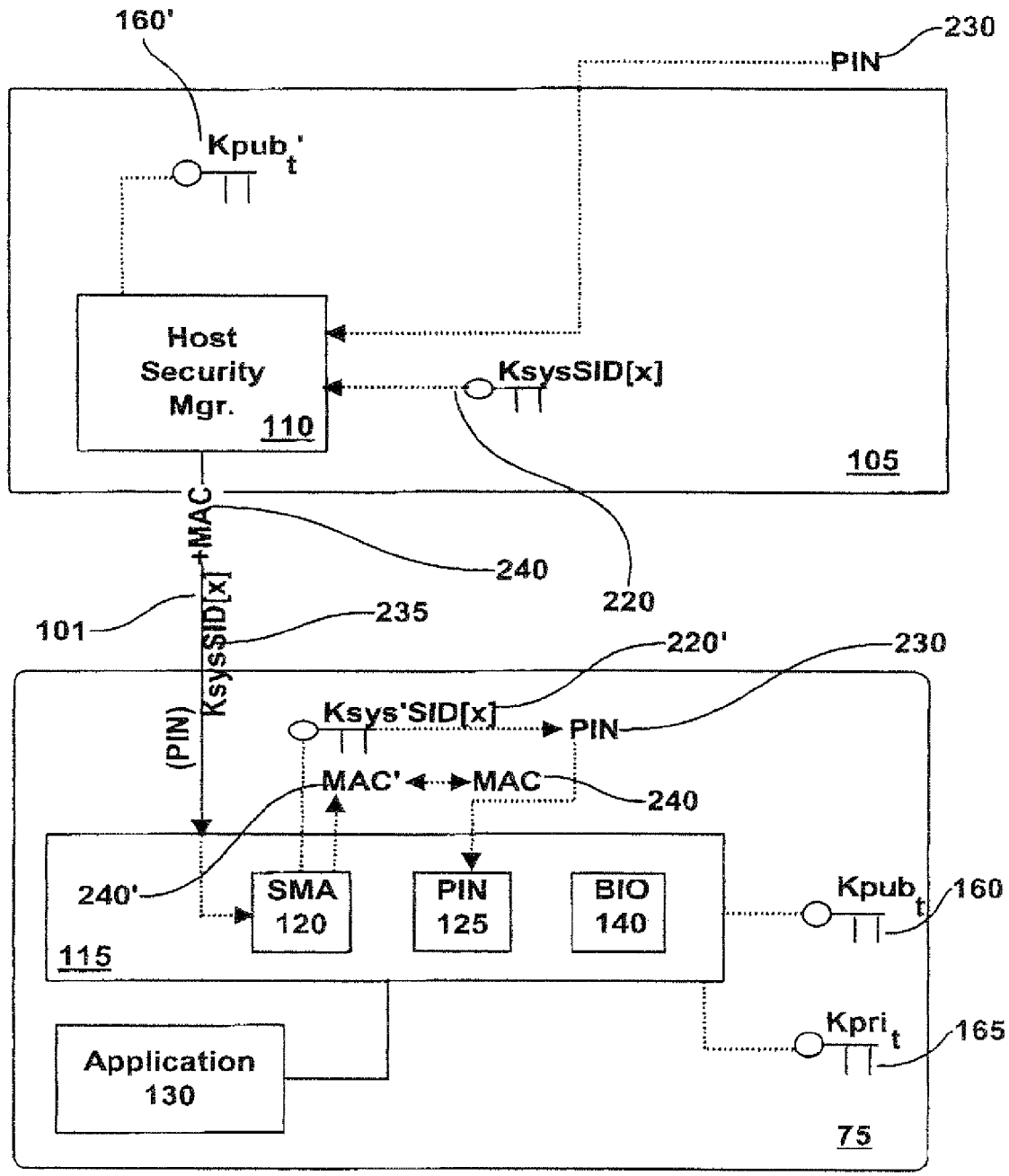
FIG. 2D—is a detailed block diagram of the invention where a CSP in the form of a PIN is encrypted using the host version of the session key and sent to the cryptographic module.

Referring to FIG. 2D, a critical security parameter (CSP) in the form a personal identification number PIN 230 is routed to the Host Security Manager 110 for secure transport to the cryptographic module 75 using the communications link 101. The secure transport of the CSP involves generating a keyed message authentication code (MAC) of at least the CSP, encryption of at least the CSP using the session key KsysSID [x] 220 and secure transport 101 of the encrypted CSP (PIN)$_{KsySID[x]}$ 235 and MAC 240 to the Security Executive application 115 installed inside the cryptographic module.

Upon receipt of the of the encrypted CSP (PIN)$_{KsySID[x]}$ 235, the Security Executive application 115 routes the encrypted CSP 235 to the secure messaging application SMA 120 for decryption using the counterpart session key Ksys'SID[x] 220'. A MAC' 240' is generated from the decrypted CSP PIN 230 and compared to the MAC 240 sent from the host computer system 105. If the generated MAC' 240' matches the received MAC 240, the decrypted PIN 230 is sent to the PIN application PIN 125 for authentication.

If the received PIN 230 matches the stored reference PIN (not shown), the sending entity is authenticated and the session key Ksys'SID[x] 220' is established as a surrogate of the PIN 230 for the duration of the session by the Security Executive application 115. The duration of the session may be controlled by events initiated by the authenticated entity or user, such as disconnection of the cryptographic module from its interface with the host, logout from the host or may be time dependent such as exceeding a predetermined session length or extended idle period may terminate the session.

Figure 2E:
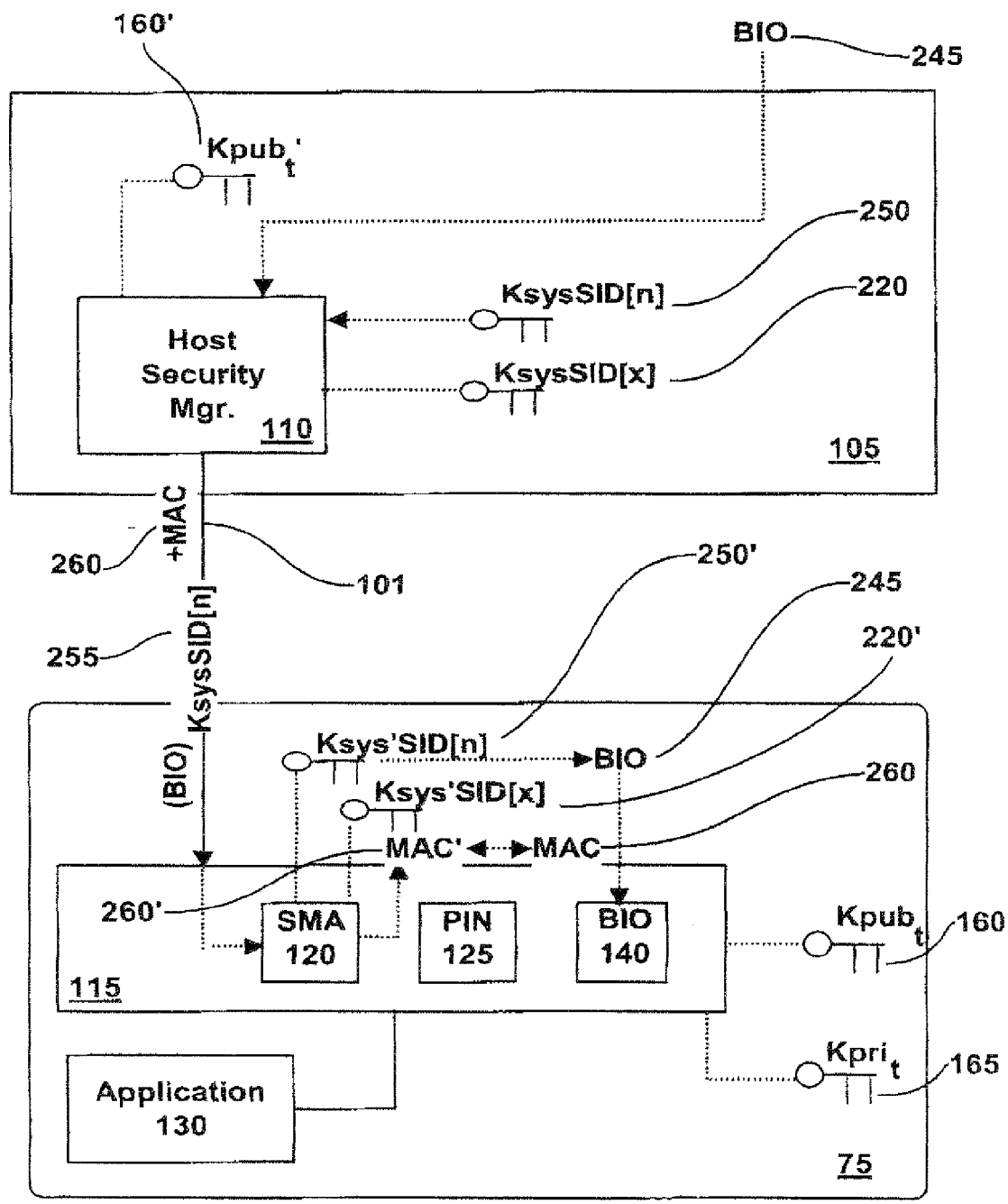
FIG. 2E—is a detailed block diagram of the invention where a CSP in the form of a biometric sample is encrypted using another host version of a session key and sent to the cryptographic module.

Referring to FIG. 2E, another CSP BIO 245 is routed to the Host Security Manager Application 110 for submission to the cryptographic module 75. This embodiment of the invention illustrates that multiple sessions and session key pairs may be established to perform functions within the cryptographic module. The flexible nature of the secure messaging arrangement and surrogate CSP assignment allows functions requiring a different CSP having different privileges associated with it, to be performed by the same entities previously authenticated within the session or identical functions may be performed by other entities who have not been previously authenticated to the cryptographic module within the session.

In this embodiment of the invention, a critical security parameter (CSP) in the form a biometric sample BIO 245 is routed to the Host Security Manager application 110 for secure transport to the cryptographic module 75 using the communications link 101. The secure transport of the CSP involves generating a keyed message authentication code (MAC) of at least the CSP, encryption of at least the CSP using another session key KsysSID[n] 250 generated as described in the discussion for FIG. 2B. For subsequent session key exchanges, an existing active session key pair may be utilized rather than the public key transfer previously employed.

The encrypted CSP (BIO)$_{KsysSID[n]}$ 255 and MAC 260 are then sent to the Security Executive application 115 installed inside the cryptographic module 75. Upon receipt of the of the encrypted CSP (BIO)$_{KsySID[n]}$ 255, the Security Executive application 115 routes the encrypted CSP (BIO)$_{KsySID[n]}$ 255 to the secure messaging application SMA 120 as before for decryption using the counterpart session key Ksys'SID[n] 250'. Another MAC' 260' is generated from the decrypted CSP BIO 245 and compared to the MAC 260 sent from the host computer system 105. If the generated MAC' 260' matches the received MAC 260, the decrypted BIO 245 is sent to the biometric application BIO 140 for authentication.

If the received biometric sample 245 matches the stored reference biometric template (not shown), the sending entity is authenticated and the session key Ksys'SID[n] 250' is established as a surrogate of the biometric sample BIO 245 for the duration of the session by the Security Executive application 115. As before, the duration of the session may be controlled by events initiated by the authenticated entity or user, such as disconnection of the cryptographic module from its interface with the host, logout from the host or may be time dependent such as exceeding a predetermined session length or extended idle period may terminate the session.

Figure 3:
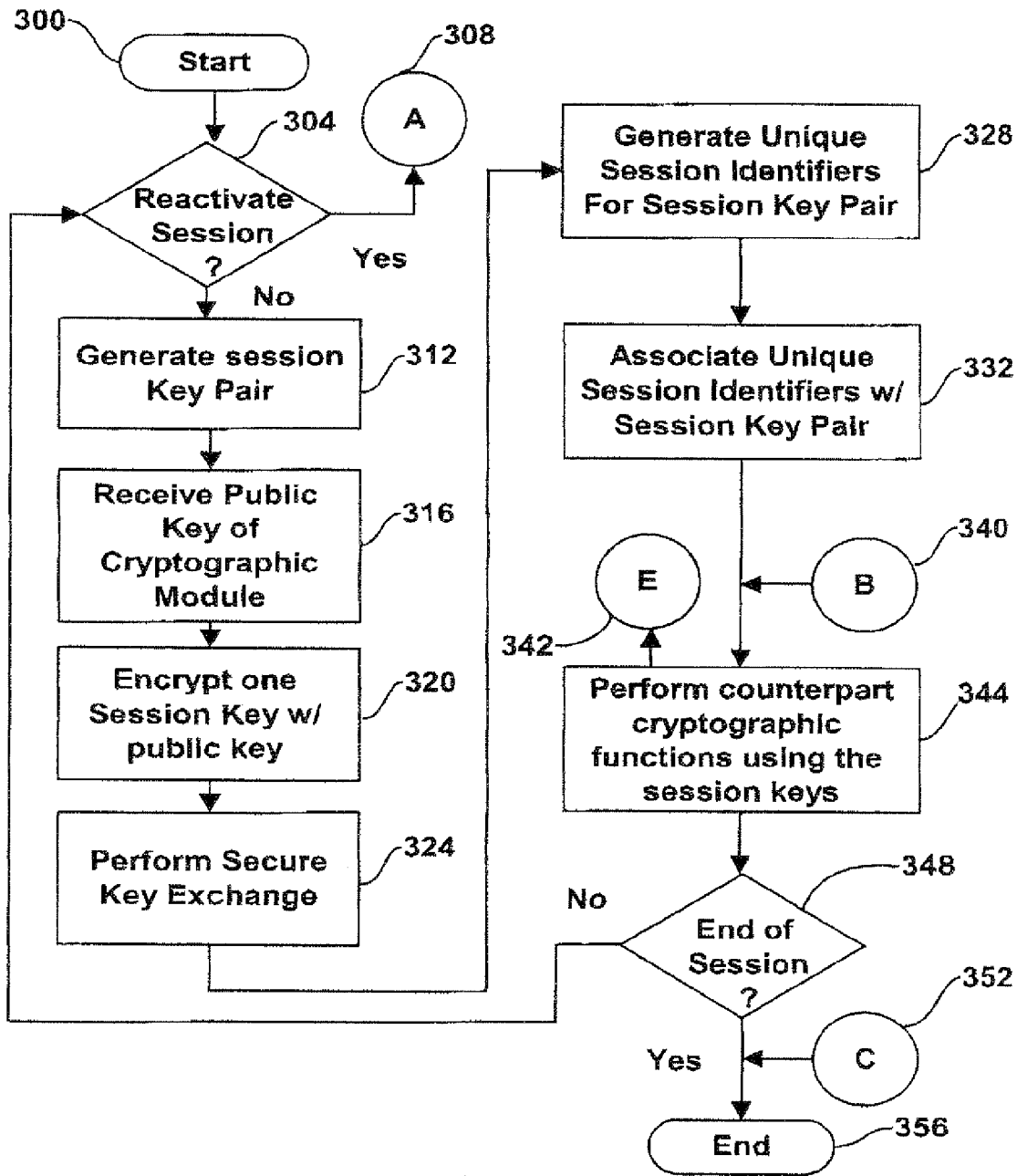
FIG. 3—is a flow diagram illustrating the major steps associated with establishing a secure messaging session between a host computer system and a functionally connected cryptographic module.

In FIG. 3, a flowchart of the major steps involved in establishing the anonymous secure messaging arrangement between a host computer system and cryptographic module is shown. The process is initiated 300 by a host computer system which determines if an idle session is available for reactivation 304. If an idle session is available, reactivation is performed in accordance with the process described in the following discussion provided for FIG. 3A. The host computer system may be local to the cryptographic module or connected remotely via a network.

If no available idle session is available 304, a session key pair is generated or derived from a random number each having a bit strength of at least 64 bits 312. In another embodiment of the invention two key pair sets are generated. One key pair set is used for bulk cryptography and the other for use in generating keyed message authentication codes. If not already present on the host computer system, a public key associated with the cryptographic module is retrieved from either the cryptographic module or from a central authority such as a certificate authority 316.

A Host Security Manager application causes one of the generated session keys to be encrypted 320 with the retrieved public key and sent to the cryptographic module. The session key is received by a Security Executive application and caused to be decrypted using an internal private key counterpart to the encrypting public key as part of a secure key exchange 324. The Security Executive application then generates a unique session identifier for the session key pair 328.

The unique session identifier is then associated with the session key pair by the Host Security Manager and Security Executive applications 332. Once the session key pair is associated with the unique session identifier, performance of counterpart cryptographic functions is performed between the host computer system and cryptographic module 344 until the session ends 356, another session needs to be reactivated 304 or a new session needs to be established 312. The details of performing the counterpart cryptographic functions 342 is described in the discussion provided for FIG. 3C which follows below.

Figure 3A:
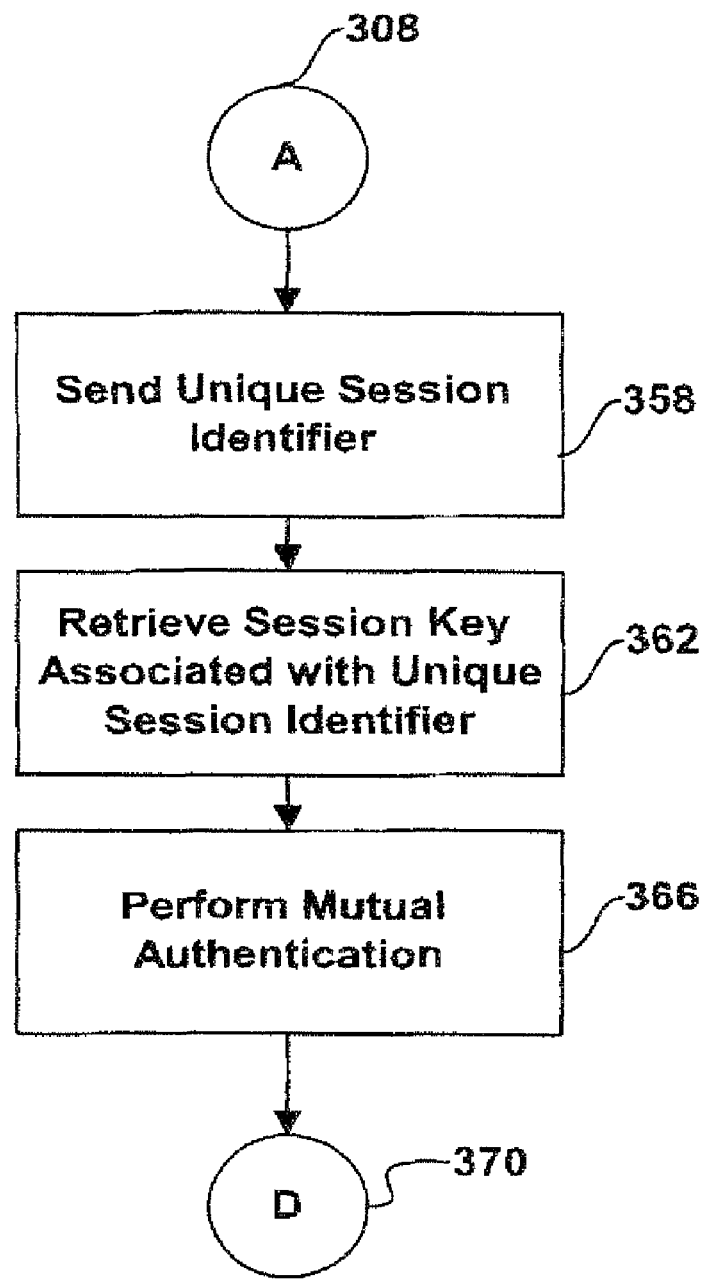
FIG. 3A—is a flow diagram illustrating the major steps associated with reestablishing a secure messaging session between a host computer system and a functionally connected cryptographic module.

Referring to FIG. 3A, if an existing session needs to be reactivated 308,
the Host Security Manager application sends the unique session identifier associated with the specific session key pair required to the Security Executive application 358.

Figure 3B:
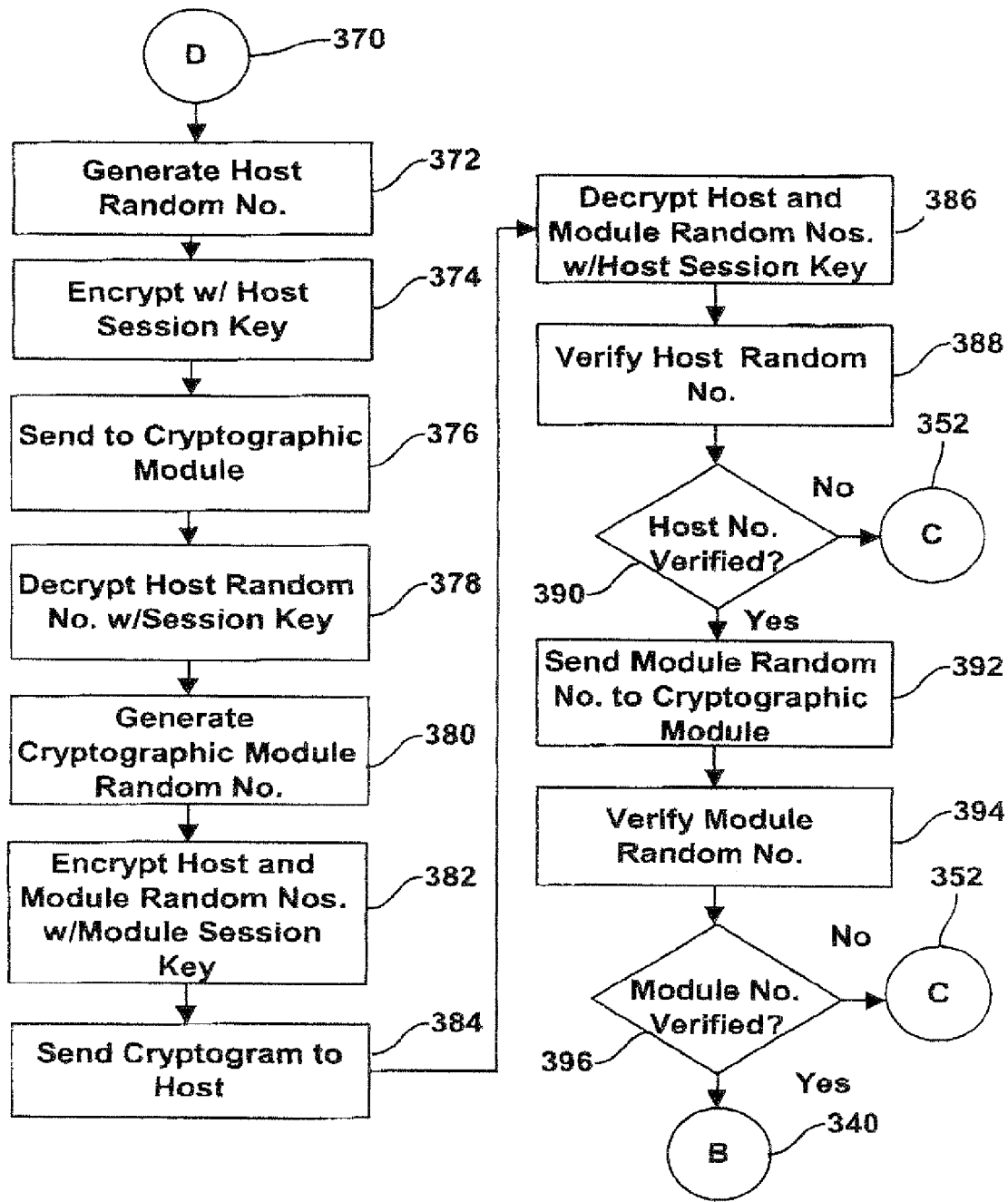
FIG. 3B—is a flow diagram illustrating the detailed steps associated with reestablishing the secure messaging session.

The Security Executive application retrieves its counterpart session key associated with the received unique session identifier 362 and a mutual authentication session is performed 366 as is described in the discussion provided for FIG. 3B 370 which follows.

Referring to FIG. 3B, the mutual authentication is performed by the Host Security Manager application causing the generation of a host random number 372 which is encrypted with the session key 374 associated with the session to be reactivated. The encrypted host random number is then sent to the Security Executive application installed inside the cryptographic module 376.

The Security Executive application causes the encrypted host random number to be decrypted using the retrieved session key 378 and causes a cryptographic module random number to be generated 380.

The host and cryptographic module random numbers are then encrypted with the retrieved cryptographic module session key 382 and the resulting cryptogram sent to Host Security Manager application installed inside the host computer system.

The Host Security Manager application causes the encrypted host and cryptographic module random numbers to be decrypted using the retrieved host session key 386. The Host Security Manager application causes the decrypted host random number to be verified against the original random number 388. If no match is found 390, processing ends 352, 356 as is shown in FIG. 3. If a match is found 390, the decrypted cryptographic module random number is returned to the sent to the Security Executive application installed inside the cryptographic module 392.

The Security Executive application causes the decrypted cryptographic random number to be verified against the original random number 394. If no match is found 396, processing ends 352, 356 as is shown in FIG. 3, If a match is found 396, the session key pair are reactivated and processing continues 340 as is shown in FIG. 3.

Figure 3C:
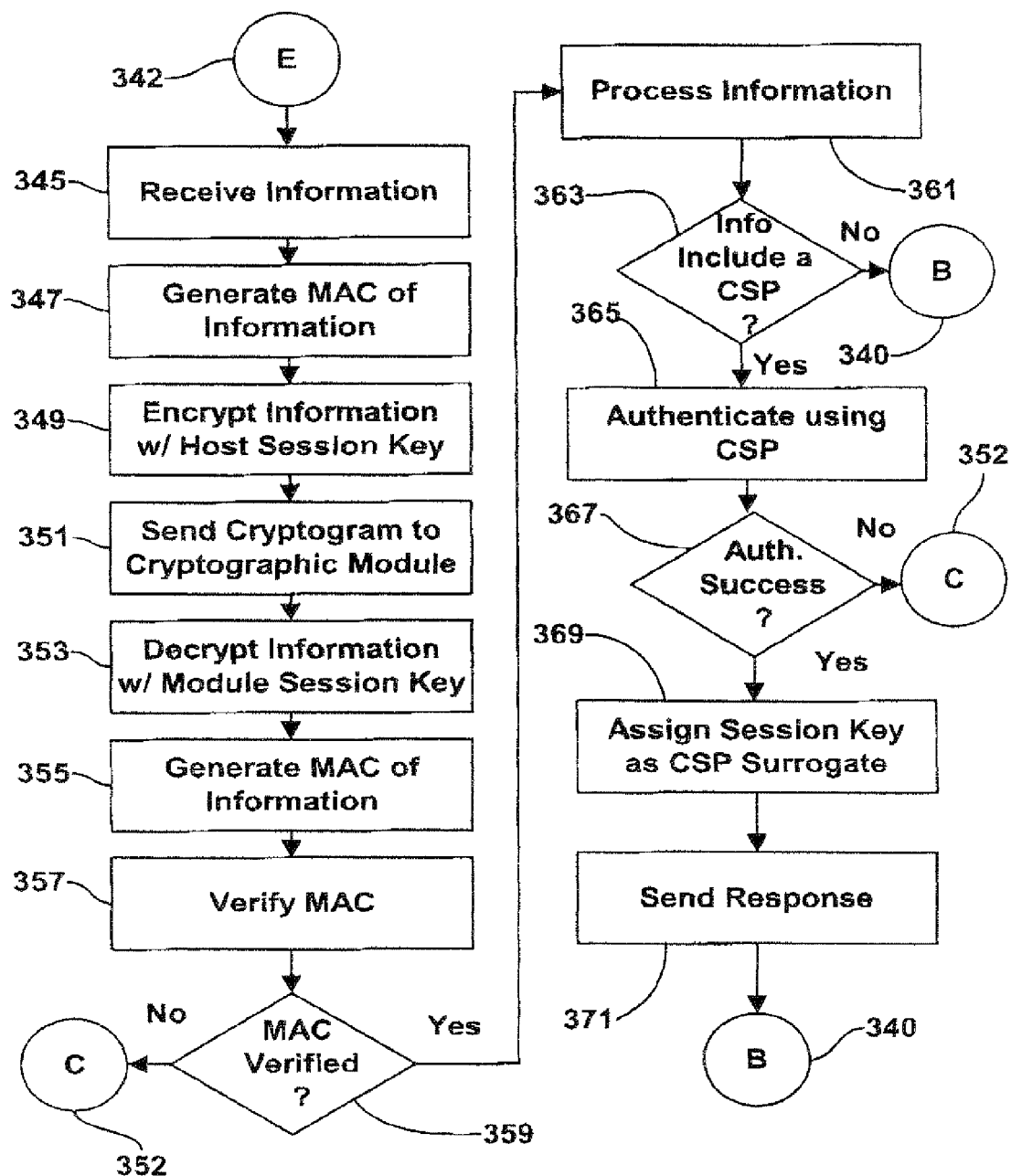
FIG. 3C—is a flow diagram illustrating the detailed steps associated with performing counterpart cryptographic functions and assignment of a session key as a surrogate for a CSP.

Lastly, referring to FIG. 3C, the major steps involved in the counterpart cryptographic functions is shown 342. The host computer system receives information to be exchanged with the cryptographic module 345. The information is routed to the Host Security Manager application which causes a keyed message authentication code to be generated 347 using either a session key or, as previously described, using a separate MAC key. The Host Security Manager application causes the received information to be encrypted using the host session key 349 and the resulting cryptogram and MAC sent to the cryptographic module 351.

The cryptogram is received by the Security Executive application which causes the cryptogram to be decrypted using the cryptographic module session key. The Security Executive application causes the generation of message authentication code using either a session key or MAC key 355. The generated MAC is then verified against the received MAC 357. If the generated MAC does not match the received MAC 359 processing ends 352, 356 as is shown in FIG. 3.

If the generated MAC does match the received MAC 359 the information is processed 361. If the received information includes a critical security parameter (CSP) 363, the CSP is used to authenticate an entity 365. If the information does not contain a CSP 363, counterpart cryptographic functions continue 340, 344 as is shown in FIG. 3. If the entity authentication is unsuccessful 367, processing ends 352, 356 as is shown in FIG. 3. If entity authentication is successful 367, the Security Executive application causes the current session key to be assigned as a CSP surrogate 369. Followed by generation of response message 371 and counterpart cryptographic functions continue 340, 344 as is shown in FIG. 3. It should be noted that steps 345-361 are performed by both the host computer system and cryptographic module as part of the secure messaging arrangement.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks. No specific limitation is intended to a particular cryptographic module operating environment. Other variations and embodiments are possible in light of above teachings, and it is not intended that this Detailed Description limit the scope of invention, but rather by the Claims following herein.

The invention claimed is:

1. A secure messaging method for securely exchanging information between a host computer system and a functionally connected cryptographic module comprising:
   generating a pair of session keys;
   performing a secure key exchange between said host computer system and said cryptographic module such that said host computer system and said cryptographic module each provided with one session key of said pair of session keys;
   generating a unique session identifier;
   associating said unique session identifier with said pair of session keys;
   performing counterpart cryptographic functions on at least a portion of information exchanged between said host computer system and said cryptographic module, wherein the exchanged information includes a credential and information of said secure key exchange corresponding to least one of the session keys; and
   verifying the credential initially before unlocking a credential protected application, wherein, after initial verification of the credential, the at least one of the session keys is temporarily granted permission to unlock the credential protected application for the duration of a session between the host computer and the cryptographic module, and wherein subsequent access to the credential protected application during the session is allowed by using the at least one of the session keys as a surrogate for the credential.

2. The method according to claim 1 wherein said counterpart cryptographic functions occur within an active session.

3. The method according to claim 2 wherein said unique session identifier is further associated with a specific function performed by said cryptographic module.

4. The method according to claim 1, further comprising:
   encrypting said credential with a public key before sending said credential to a security token; and
   decrypting said credential with a private key before unlocking said credential protected application.

5. The method according to claim 1 wherein said credential includes a critical security parameter (CSP).

6. The method according to claim 5 wherein said session keys are temporarily surrogates for said CSP after successfully performing a prerequisite initial authentication.

7. The method according to claim 1 wherein said session keys incorporate a timestamp or the unique session identifier.

8. The method according to claim 1, wherein the pair of session keys include a pair of identical session keys.

9. A secure messaging system for securely exchanging information between a host computer system and a functionally connected cryptographic module comprising:
   at least one hardware processor;
   a host security manager application stored on a first non-transitory computer readable medium and being executable by the at least one hardware processor to:
   generate a session key pair,
   associate at least one session key of said session key pair with a unique session identifier,
   perform a secure key exchange with said cryptographic module, wherein a session key associated with said unique session identifier is securely provided to said cryptographic module, and
   perform counterpart cryptographic functions on at least a portion of information exchanged between said host computer system and said cryptographic module, wherein the exchanged information includes a credential and information of said secure key exchange corresponding to least one of the session keys, and
   a security executive application stored on a second non-transitory computer readable medium and being executable by the at least one hardware processor to:
   generate said unique session identifier,
   associate said unique session identifier with said exchanged key,
   perform counterpart cryptographic functions on at least a portion of the information exchanged between said host computer system and said cryptographic module, and
   verify the credential initially before unlocking a credential protected application, wherein, after initial verification of the credential, the at least one of the session keys is temporarily granted permission to unlock the credential protected application for the duration of a session between the host computer and the cryptographic module, and wherein subsequent access to the credential protected application during the session is allowed by using the at least one of the session keys as a surrogate for the credential.

10. The system according to claim 9 wherein said security executive application further shares said unique session identifier with said host security manager application.

11. The system according to claim 9 wherein said cryptographic functions includes encryption, decryption and message authentication.

12. The system according to claim 9 wherein at least a portion of said cryptographic functions are performed using said session key pair.

13. The system according to claim 9 wherein said credential includes a critical security parameter (CSP).

14. The system according to claim 13 wherein said security executive application further allows said session key pair to act as a temporary surrogate of said CSP after successfully performing a prerequisite initial authentication using said CSP.

15. The system according to claim 14 wherein said temporary surrogate remains valid for at least a portion of a session.

16. The system according to claim 15 wherein said session may be reactivated.

17. The system according to the claim 9, wherein the pair of session keys include a pair of identical session keys.

* * * * *